(12) United States Patent
Tiana et al.

(10) Patent No.: US 11,163,320 B1
(45) Date of Patent: Nov. 2, 2021

(54) PROCESSING OF MULTISPECTRAL SENSORS FOR AUTONOMOUS FLIGHT

(71) Applicant: Rockwell Collins, Inc., Cedar Rapids, IA (US)

(72) Inventors: Carlo L. Tiana, Portland, OR (US); Weston J. Lahr, Sherwood, OR (US); Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 394 days.

(21) Appl. No.: 16/288,531

(22) Filed: Feb. 28, 2019

(51) Int. Cl.
| | |
|---|---|
| G05D 1/10 | (2006.01) |
| G01S 17/933 | (2020.01) |
| B64D 45/08 | (2006.01) |
| B64D 47/02 | (2006.01) |
| B64D 47/08 | (2006.01) |
| G05D 1/04 | (2006.01) |
| G01S 13/90 | (2006.01) |
| G01S 13/933 | (2020.01) |
| G01S 17/90 | (2020.01) |
| B64D 45/00 | (2006.01) |

(52) U.S. Cl.
CPC ............ *G05D 1/101* (2013.01); *B64D 45/08* (2013.01); *B64D 47/02* (2013.01); *B64D 47/08* (2013.01); *G01S 13/90* (2013.01); *G01S 13/933* (2020.01); *G01S 17/90* (2020.01); *G01S 17/933* (2013.01); *G05D 1/042* (2013.01); *B64D 2045/0085* (2013.01)

(58) Field of Classification Search
CPC ........ G05D 1/101; G05D 1/042; G01S 17/90; G01S 13/933; G01S 17/933; G01S 13/90; B64D 45/08; B64D 47/02; B64D 47/08; B64D 2045/0085
See application file for complete search history.

(56) References Cited

U.S. PATENT DOCUMENTS

2018/0032042 A1\* 2/2018 Turpin ................... B64D 47/08

\* cited by examiner

*Primary Examiner* — Aniss Chad
*Assistant Examiner* — Chase L Cooley
(74) *Attorney, Agent, or Firm* — Suiter Swantz pc llo

(57) ABSTRACT

A system and method are disclosed for design of a suite of multispectral (MS) sensors and processing of enhanced data streams produced by the sensors for autonomous aircraft flight. The suite of MS sensors is specifically configured to produce data streams for processing by an autonomous aircraft object identification and positioning system processor. Multiple, diverse MS sensors image naturally occurring, or artificial features (towers buildings etc.) and produce data streams containing details which are routinely processed by the object identification and positioning system yet would be unrecognizable to a human pilot. The object identification and positioning system correlates MS sensor output with a-priori information stored onboard to determine position and trajectory of the autonomous aircraft. Once position and trajectory are known, the object identification and positioning system sends the data to the autonomous aircraft flight management system for autopilot control of the autonomous aircraft.

20 Claims, 11 Drawing Sheets

PROCESSING OF MULTISPECTRAL SENSORS FOR AUTONOMOUS FLIGHT

CROSS-REFERENCE TO RELATED APPLICATIONS

The present application is related to the following co pending U.S. Patent Applications:

U.S. patent application Ser. No. 16/288,407 filed Feb. 28, 2019 entitled "Multispectrally Enhanced Synthetic Vision Database System and Method", U.S. patent application Ser. No. 16/288,770 filed Feb. 28, 2019 entitled "Autonomous Aircraft Sensor-Based Positioning and Navigation System Using Markers", and U.S. patent application Ser. No. 16/289,786 filed Mar. 1, 2019 entitled "Guidance Deviation Derivation from High Assurance Hybrid Position Solution System and Method", the contents of which above-named U.S. Patent Applications are herein incorporated by reference in their entirety.

BACKGROUND

Sensors designed to assist a human pilot in aircraft positioning may be specifically configured for human consumption. Such human oriented sensors may maintain a mandated limitation in performance parameters (e.g., color, latency, frame rate) dictated by either regulations or human factor considerations, or both. Such sensor data may be specifically configured to match an ability of the crew and platform to react to sensor imagery. Traditional sensor system design is driven by the need to produce "natural looking" images to pilots, requiring the complex and often information-occluding task of forming visually pleasant imagery.

Further, the manned aircraft operating under a supervisory authority (e.g. U.S. Federal Aviation Administration (FAA)) may require a display specifically formatted to be visible by a human. Such human oriented displays such as a heads-up display (HUD) and multi-function display (MFD) may require a specific dynamic range visible to the human pilot. A limited number of different monochromatic colors (of grey for example) may be required for the human pilot to determine range and motion of objects within the visible display. The additional hardware (weight) and processing power to produce the image configured for consumption by the human pilot may require excessive infrastructure and computing power. In certain circumstances, this limitation in dynamic range may inhibit the human pilot from discerning one object from another. For example, in a weather situation including a sunlit fog, the limited human oriented display may by unable to distinguish approach lights from the fog.

Some display systems for sensor imagery may require a transparent display in order to enable the human pilot an immediate comparison of sensor imagery to real world. This requirement greatly constrains the dynamic range and processing of sensor imagery. Display (and to some extent the Human Visual System) are constrained in instantaneous dynamic range, which requires high-dynamic-range imagery from sensors to be manipulated for crew consumption often resulting in loss of image detail as well as complex and costly processing systems.

Traditional color displays configured for human consumption may include a monochrome green scheme designed to limit interference with additional details presented or visualized in, or through, the display. For example, a traditional heads up display (HUD) may maintain an intrinsic limitation of presentation of a monochrome green scale of colors with a limitation of a number of shades of green.

In addition, multispectral (MS) systems operating under the supervisory authority may be required to generate and display a single pilot selectable video stream to prevent pilot evaluation and cumbersome spectrum selection of the "best" sensor for a current environment.

Therefore, a need remains for a system and related method for configuring a multispectral (MS) sensor suite onboard an autonomous aircraft to create a data stream specifically configured for processor consumption.

SUMMARY

In one aspect, embodiments of the inventive concepts disclosed herein are directed to a system for for multispectral object identification. The system may comprise a multispectral (MS) sensor suite onboard an autonomous aircraft including a vision system (VS), a radio frequency (RF) radio detection and ranging (RADAR) system, a laser imaging detection and ranging (LIDAR) system. The system may employ an object identification and positioning system associated with the MS sensor suite including a processor and a storage.

A MS database within the storage configured to communicate with the processor with the processor, the MS database including a plurality of historical object data defining an associated plurality of objects. A tangible, non-transitory memory within the storage configured to communicate with the processor, the tangible, non-transitory memory having instructions stored therein that, in response to execution by the processor, cause the processor to receive first sensor data from a first sensor of the autonomous aircraft sensor suite, the first sensor data including a first attribute of a sensed object. Here, the first sensor data may be received at a first frame rate and at a first latency, the first frame rate and first latency suitable for a flight control of the autonomous aircraft. Also, the first sensor data may be received at a second frame rate and at a second latency, the second frame rate and second latency suitable for a positioning of the autonomous aircraft.

The processor may further receive second sensor data from second sensor of the autonomous aircraft sensor suite, the second sensor data including a second attribute of the sensed object. The second sensor data may be received within a first color spectrum and within a first dynamic range, the first color spectrum and the first dynamic range suitable for an object identification. Here, the second sensor data may also be received within a second color spectrum and within a second dynamic range, the second color spectrum and the second dynamic range suitable for a navigation of the autonomous aircraft.

The processor may compare the received first attribute and the second attribute to the historical object data and identify the sensed object if one of the first or second attribute comparison results in a match. The processor may also determine a position of the autonomous aircraft based on the identification of the sensed object, determine a trajectory of the autonomous aircraft based on the autonomous aircraft position over time, and command an autopilot to manipulate an autonomous aircraft flight control based on one of the position and the trajectory.

An additional embodiment of the inventive concepts disclosed herein may be directed to a method for for multispectral object identification. The method may comprise receiving first sensor data from a first sensor of an autonomous aircraft sensor suite onboard an autonomous aircraft, the first sensor data including a first attribute of a sensed object, the first sensor data received at a first frame rate and at a first latency, the first frame rate and first latency suitable for a flight control of the autonomous aircraft, the first sensor data also received at a second frame rate and at a second latency, the second frame rate and second latency suitable for a positioning of the autonomous aircraft.

The method may also include receiving second sensor data from a second sensor of the autonomous aircraft sensor suite, the second sensor data including a second attribute of the sensed object, the second sensor data received within a first color spectrum and within a first dynamic range, the first color spectrum and the first dynamic range suitable for an object identification, the second sensor data also received within a second color spectrum and within a second dynamic range, the second color spectrum and the second dynamic range suitable for a navigation of the autonomous aircraft.

The method may further compare the received a first attribute and the second attribute to a historical object data within a multispectral database and identify the sensed object if one of the first or second attribute comparison results in a match. The method may determine a position of the autonomous aircraft based on the identification of the sensed object, determine a trajectory of the autonomous aircraft based on the autonomous aircraft position over time, and command an autopilot to manipulate an autonomous aircraft flight control based on the position and the trajectory.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function.

In the drawings in which.

DETAILED DESCRIPTION OF EXEMPLARY EMBODIMENTS

Figure 1:
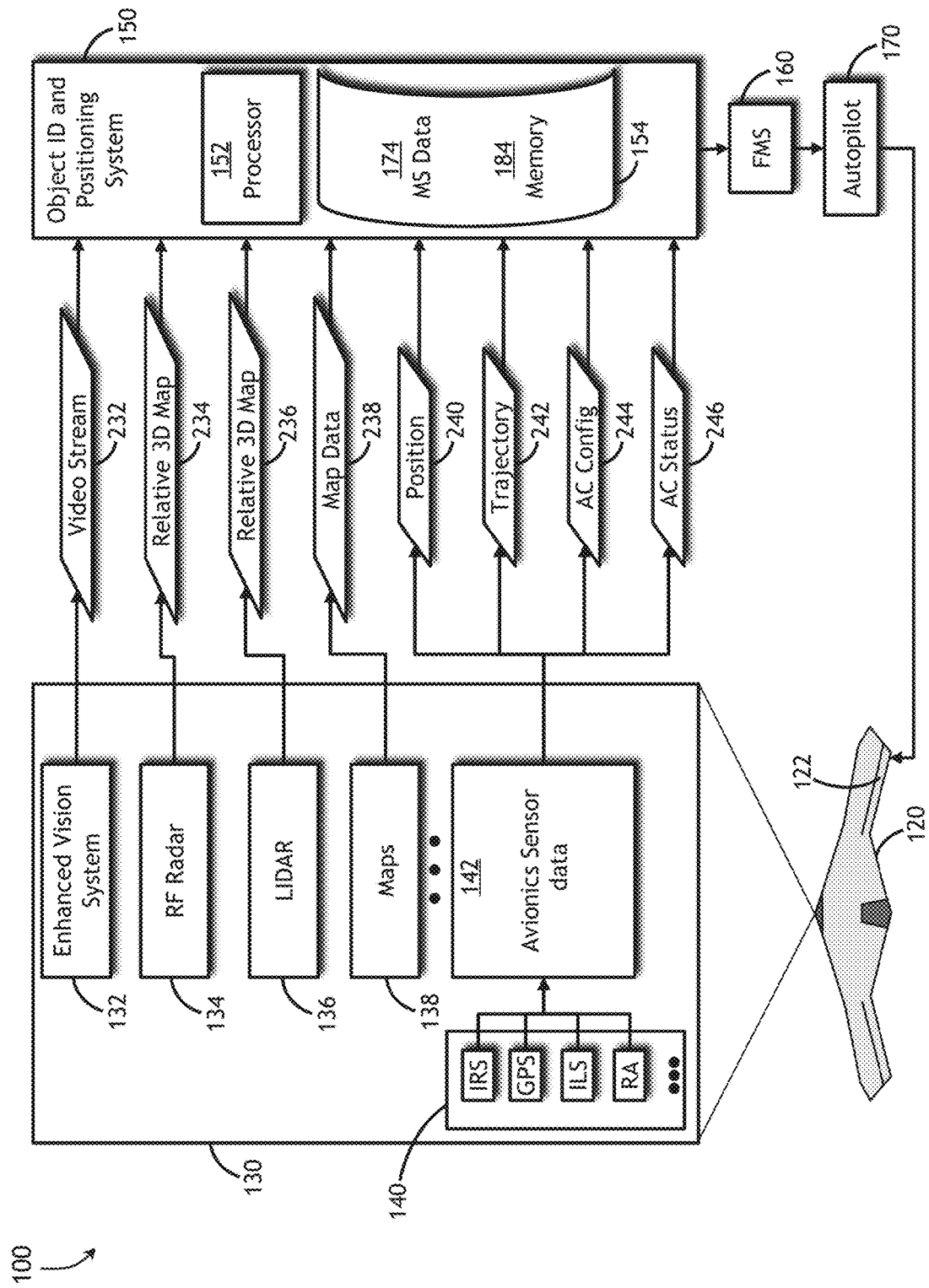
FIG. 1 is a diagram of a multispectral object identification system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method are disclosed for design of a suite of multispectral (MS) sensors and processing of enhanced data streams produced by the sensors for autonomous aircraft flight. The suite of MS sensors is specifically configured to produce data streams for processing by an autonomous aircraft object identification and positioning system processor. Multiple, diverse MS sensors image naturally occurring, or artificial features (towers buildings etc.) and produce data streams containing details which are routinely processed by the object identification and positioning system yet would be unrecognizable to a human pilot. The object identification and positioning system correlates MS sensor output with a-priori information stored onboard to determine position and trajectory of the autonomous aircraft. Once position and trajectory are known, the object identification and positioning system sends the data to the autonomous aircraft flight management system for autopilot control of the autonomous aircraft.

| Reference Chart | |
|---|---|
| 100 | Multispectral System |
| 120 | Autonomous Aircraft |
| 122 | Flight Control Surface |
| 130 | Sensor Suite |
| 132 | Vision System (VS) |
| 134 | RF RADAR System |
| 136 | LIDAR System |
| 138 | Maps System |
| 140 | Avionics Sensors |
| 142 | Avionics Sensor Data |
| 150 | Object ID and Positioning System |
| 152 | Processor |
| 154 | Storage |
| 160 | Flight Management System |
| 170 | Autopilot |
| 174 | Multispectral Database |
| 180 | Nav Latency |
| 182 | Flight Latency |
| 184 | Memory |
| 190 | Nav Feedback |
| 190 | Navigation Feedback |
| 192 | Trajectory Feedback |
| 192 | Trajectory Feedback |
| 200 | Diagram of Sensor Data |
| 232 | Video Stream |
| 234 | RADAR Relative Map |
| 236 | LIDAR Relative Map |
| 238 | Map Data |
| 240 | Position |
| 242 | Trajectory |
| 244 | Aircraft Configuration |
| 246 | Aircraft Status |
| 300 | MS Sensor System Logic |
| 302 | Receive sensor data |
| 304 | Flight Analysis |
| 306 | Determine Sensor Hierarchy |
| 308 | Sensor Purpose |
| 310 | Frame Rate/Latency |
| 312 | Detect/ID Object |
| 314 | Trajectory Vertical Speed |
| 316 | Pitch Roll Yaw |
| 320 | Dynamic Range/Color |
| 322 | Detect/ID Object |
| 324 | Position Altitude |

| Reference Chart | |
|---|---|
| 326 | Navigation/Flight Path |
| 350 | Sensor Hierarchy Factors |
| 400 | MS Sensors Method |
| 402 | Receive First Sensor Data |
| 404 | Receive Second Sensor Data |
| 406 | Compare Attributes |
| 408 | Identify Sensed Object |
| 410 | Determine Position |
| 412 | Determine Trajectory |
| 414 | Command Autopilot |
| 500 | Arrival View |
| 502 | Neighborhood |
| 504 | PAJN RW26 Threshold |
| 506 | Marina |
| 508 | Sensor Line of Sight |
| 510 | Bridge Center |
| 512 | Pier T |
| 514 | Land Mass |
| 516 | Road Junction |
| 518 | Ship Dock |
| 520 | Salmon Hatchery |
| 522 | Coghlan Island |
| 524 | Auke Hill |
| 526 | Juneau Hill |
| 528 | Blast Pad Markings Corner |
| 530 | Aiming Point Markings |
| 532 | Hold Short Line |
| 534 | Sequenced Flashing White |
| 536 | Centerline Bars White |
| 538 | 1000 Ft Bar White |
| 540 | Side Row Bar Red |
| 542 | Threshold Green |
| 544 | Runway Edge White |
| 546 | PAPI/VASI White |
| 548 | PAPI/VASI Red |
| 550 | USN Optical Landing System |
| 600 | Approach View |
| 700 | Aspect Views |
| 720 | Boat Dock |
| 722 | Boat Dock Corner W |
| 724 | Boat Dock Corner NW |
| 726 | Boat Dock Corner NE |
| 728 | Boat Dock Corner SE |
| 740 | Hatchery Ponds |
| 750 | Long Pier |
| 800 | Final Approach View |
| 900 | Short Final View |
| 1000 | Approach Lights |
| 1100 | Runway Lights |

FIG. 1 Sensor Hardware

Referring now to FIG. 1, a diagram of a multispectral object identification system in accordance with an embodiment of the inventive concepts disclosed herein is shown. A MS system 100 may enable the autonomous aircraft 120 to receive sensor data from a plurality of sensors within a sensor suite 130. Within the sensor suite 130, a Vision System (VS) 132, a RF RADAR system 134, a LIDAR system 136, a maps system 138 and an avionics suite 140 may provide sensor data to an object ID and positioning system 150. Avionics sensor data 142 may include data generated by an Inertial Reference System (IRS), a Global Positioning System (GPS), an Instrument Landing System (ILS), and a Radio Altimeter system (RA). Contemplated herein, additional avionics sensors may be beneficial to the object ID and positioning system 150 for used in accordance with embodiment described herein.

Further, the object identification and positioning system 150 may include a processor 152 and a storage 154. The storage 154 may comprise a MS database 174 which may be functional to store a plurality of attributes associated with each object. Storage 154 may also include a memory 184 functional to house a tangible, non-transitory memory within the storage which may be configured to communicate with the processor 152. The tangible, non-transitory memory having instructions stored therein that, in response to execution by the processor 152, cause the processor 152 to perform operational commands.

In one embodiment of the inventive concepts disclosed herein, the sensor suite 130 may include a plurality of sensors configured for providing information to the object ID and positioning system 150. An operator may select one or more sensors to accomplish a specific mission yet minimize size, weight, power and cost. Each sensor suite may span a large swath of the electromagnetic spectrum allowing atmospheric penetration in the relevant ranges of approximately 1 to 10 km. Sensors which may operate in the Visual Spectrum, from approximately 450 to 700 nm, in the Near-Infrared (NIR) spectrum of approximately 750 to 950 nm, in the Short-Wave Infrared (SWIR) spectrum operating approximately in the 1-2 µm spectral band and thermal infrared sensors operating in the 3 to 5 µm and 7 to 15 µm bands may fall within the scope of the inventive concepts disclosed herein.

These sensors may support frame rates of a minimum required of about 10 Hz and up to 400 Hz, or more. Other sensors may operate in the Radio-Frequency bands, from X to W band, from 10 GHz to 220 GHz and operate in pulsed or Frequency Modulated Continuous Wave (FMCW) RADAR mode, with frame update rates of a minimum of 10 Hz and up to 30 Hz or higher, potentially scanning a "region of interest" within the total field of view. Each of these sensors may provide "Enhanced Vision System" capabilities to a modern cockpit. Another type of "synthetic" image may be computer generated from an onboard a-priori database and is typically referred to as a "Synthetic Vision System (SVS)". Each of these sources of positioning information may be combined into a "Combined Vision System (CVS)" which may present to a human pilot flying (onboard and remote), and to an autonomous aircraft pilotage system, an overall reliable and assured view of the operating environment in all visibility conditions.

The object ID and positioning system 150 may process sensor data and supply positioning and trajectory information to an autonomous aircraft FMS 160, The FMS 160 may then command an autopilot 170 to manipulate one or more flight controls 122 of the autonomous aircraft 120. Flight controls 122 may include traditional roll, pitch, and yaw controls such as an aileron, elevator, and rudder. However, a plurality of hybrid flight controls (e.g., spoilers, split rudders, differential drag devices, differential thrust, elevon, etc.) may fall within the scope of the inventive concepts disclosed herein.

In embodiments, sensor data may include an object attribute such as an object identification (name, reference, etc.), a position of the object with reference to a datum, an altitude of the object (mean sea level and above ground level), and a bearing, range, and altitude (BRA) of the object relative to the autonomous aircraft 120. The datum may be defined as a vertical geodetic reference datum (altitude) and a horizontal geodetic reference datum (latitude, longitude, grid).

An attribute of the sensed object may include a plurality of characteristics of the sensed object which may define the sensed object. Some exemplary attributes may include a shape, a size, a texture, a reflectivity level, a radar cross section, a color, and a three-dimensional position relative to the datum.

The object identification and positioning system 150 may be configured to receive sensor data from one or more sensors of the sensor suite 130 where the sensor data may include the plurality of attributes associated with a sensed object. Here, a sensed object may be defined as any object within a field of view (FOV) of one of the sensors and able to be imaged and therefore measured by the sensor. Also, a sensed object may include a terrain object, a geographical object, a natural object, a man-made object, an airport prepared surface, and a landing surface. An attribute of the sensed object may include characteristics of the sensed object which may highlight the object to the specific sensor.

For example, a desired object may include any object to which or from which an operator of the autonomous aircraft 120 may desire navigation or positioning. Here, an object may include a sensor significant object able to be sensed by any of the sensors within the sensor suite 130. For example, a desirable object may include a building, a road intersection, a RADAR significant object, a flight deck, an aircraft, and a target of interest. Each sensed object may inherently possess a plurality of attributes which may describe the object.

For example, an attribute of a sensed object may include an object three-dimensional position relative to the datum (e.g., latitude, longitude, MSL altitude), a visibly distinct difference from surrounding terrain (e.g., color texture, size, terrain flow), a RADAR cross section (RCS), a specific map feature, a shape, a size, a reflectivity level, a radar cross section, and a frequency of RF radiation. Each sensor within the sensor suite 130 may sense a specific attribute of an object and operate solely (positioning) or in concert (hybrid positioning) to assist the object identification and positioning system 150 in determining a precise position of the autonomous aircraft 120.

Optical Sensors

The MS system 100 may include a plurality of optical sensors included within the VS 132. The VS 132 may include a plurality of components and capabilities. One component of the VS 132 may include a Synthetic Vision System (SVS) configured to receive data from a database and provide database generated attributes to the object ID and positioning system 150 for use in positioning. Another component of the VS 132 may include an Enhanced Vision System (EVS) including a camera sensor of a plurality of wavelengths and providing those camera sensed attributes to the object ID and positioning system 150. Additionally contemplated herein, a Combined Vision System (CVS) may incorporate within the VS 132 to provide a synthesis of both database attributes with camera sensed attributes offered to the object ID and positioning system 150 for analysis and autonomous aircraft 120 position determination.

For example, the VS 132 may be capable of imaging a specific pattern of terrain such as a mountain range, a runway pattern, a river, or a river valley. In one embodiment, the VS 132 may function receiving data from the MS database 174 coupled with additional positioning sensors, offering object attributes to the object ID and positioning system 150 for for precise positioning of the autonomous aircraft 120. In additional embodiments, the VS 132 may employ a camera to image surrounding objects and offer the sensed data via a video stream data 232 to the object ID and positioning system 150.

One attribute of the terrain or runway object may be its distinct difference from surrounding terrain. Coupled with a terrain database within the MS database 174, the VS 132 by itself may offer precise positioning ability to the autonomous aircraft 120 based on a single bearing and range from the known position of the known (historical attributes) object or a triangulation of bearings from two or more optically sensed objects.

In one embodiment of the inventive concepts disclosed herein, the sensor suite 130 may employ sensors configured for passive reception of light energy. Sensor suite 130 may employ a plurality of light sensors capable of imaging a plurality of light frequencies and wavelengths. Here, a light sensor or combination of light sensors configured for imaging objects which project light with the above characteristics may fall within the VS 132 to provide sensor data to the object ID and positioning system 150.

An exemplary table of colors and characteristics of light may be functional with sensors configured for the autonomous aircraft 120:

| Color | Wavelength (nm) | Frequency (THz) |
|---|---|---|
| Infrared | >1000 | <300 |
| Red | 700 | 428 |
| Orange | 620 | 484 |
| Yellow | 580 | 517 |
| Green | 530 | 566 |
| Cyan | 500 | 600 |
| Blue | 470 | 638 |
| Violet | 420 | 714 |
| Near Ultraviolet | 300 | 1000 |
| Far Ultraviolet | <200 | >1500 |

Contemplated herein, an active illuminator of a plurality of light frequencies may function within one embodiment of the inventive concepts disclosed herein, the reflected illumination (e.g. IR landing light) reflected to one of the light sensors may provide the object ID and positioning system 150 with valuable information in certain environments.

In one embodiment of the inventive concepts disclosed herein, the sensor suite 130 may be comprised of a plurality of MS sensors. In one embodiment, a plurality of sensors capable to receive within a plurality of IR bands may function within the scope of the invention. For example, a sensor capable to discern a signal with a wavelength of greater than 1000 nm and a frequency of approximately 300 THz may fall within the scope of the concepts herein.

Radar

The RF RADAR system 134 may include a plurality of RADAR types and systems for object detection and object identification. Some exemplary radar systems may include an imaging RADAR system of 10 to 100 GHz configured for ground mapping and detection of radar significant objects. For example, a synthetic aperture radar (SAR) and an Inverse synthetic aperture radar (ISAR) may function within the scope of the inventive concepts herein.

The RF RADAR system 134 may also operate solely as a positioning system, capable of generating a relative 3D map data 234 and provide the data to the object ID and positioning system 150 for BRA determination from a single known object or a BRA triangulation from two or more sensed objects. Also, the RF RADAR system 134 may function to complement each of the other sensors within the sensor suite 130. A RADAR significant object having a RADAR cross section (RCS) measurable by the RF RADAR system 134 sensor may be one example of an object sensed by the RF RADAR system 134. Depending on RF RADAR system 134 sensitivity, an object with a high RCS or low RCS may be a desirable object to use by the object ID and positioning system 150 for precise positioning.

For example, an electrical grid hub of converging towers and wires may be exceptionally visible to the RF RADAR system 134. Compared with historical positioning data within the MS database 174, the object identification and positioning system 150 may determine the precise position based on BRA information as well as an aircraft trajectory and speed from position data over time. Sensed RADAR data compared with RCS attributes of historical objects within the MS database 174 may offer precise triangulation positioning capabilities based solely on returns from the RF RADAR system 134. Combined with the relative 3D map data 234, the object identification and positioning system 150 may determine the precise position based on sensed data from one or more of the additional sensors within the sensor suite 130.

LiDAR

The sensor suite may also employ the LIDAR system 136 to sense objects nearby the autonomous aircraft 120. Transmitted laser energy from the LIDAR system 136 may be reflected and received to produce the LIDAR relative 3D map data 236. The LIDAR 3D map data 236 may provide a detailed snapshot of sensed objects within the FOV of the LIDAR system 136. As a sole positioning source, or in combination with the additional sensors, the LIDAR system 136 may supply the LIDAR relative 3D map data 236 to the object identification and positioning system 150 allowing the object identification and positioning system 150 to determine positioning and trajectory information based on the sensed object BRA from the autonomous aircraft 120.

Maps

Map system 138 may function to provide the object identification and positioning system 150 with detailed ground map data 238 from an area relevant to autonomous aircraft 120. Combined with inputs from onboard positioning systems, the object identification and positioning system 150 may receive the map data from the MS database 174 and correlate the map data with received sensor data to determine the precise position.

For example, the map data may include an airport diagram including runways, taxiways, and buildings (e.g., hangars). The object identification and positioning system 150 may correlate the precise position with the map data 238 to navigate the autonomous aircraft 120 to a position for possible landing on one of the runways. Further, during a taxi phase, the object identification and positioning system 150 may determine the precise position of the autonomous aircraft 120 based on received sensor data correlated with the airport diagram of the taxiways.

Avionics

In one embodiment of the inventive concepts disclosed herein, the avionics suite 140 may operate to provide the object identification and positioning system 150 with traditional avionics sensor data 142 allowing the object identification and positioning system 150 to correlate the avionics sensor data with additional sensor data to determine the precise position. An inertial reference system (IRS) may function as a traditional inertial system to offer accurate positioning information to the object identification and positioning system 150.

A global positioning system (GPS) may offer similar, likely more accurate, positioning information to the object identification and positioning system 150. Here, the term GPS may refer to all satellite-based positioning and timing systems. The generic term GPS is used here for descriptive purposes only and may not limit the use of additional satellite-based systems for the object identification and positioning system 150 to determine the precise position.

Each of the IRS and the GPS may offer position data 240 for the object ID and positioning system 150 to use as one source of positioning information. In addition, IRS and GPS data over time may offer trajectory data 242 to the object ID and positioning system 150. Autonomous aircraft 120 configuration data 244 as well as autonomous aircraft 120 status data 246 may aid the object ID and positioning system 150 in determining the precise position.

In embodiments, an ILS system may provide the object identification and positioning system 150 with accurate localizer and glideslope information relative to a desired runway. By itself, the ILS system has traditionally and accurately guided aircraft to runways. However, working in cooperation with the object identification and positioning system 150, the ILS may offer accurate positioning information relative to a runway and increase the accuracy of the precise position.

In one embodiment of the inventive concepts disclosed herein, a Radio Altimeter (RA) system may operate similar to a traditional manner offering precise altimetry within a threshold AGL altitude. For example, if the autonomous aircraft 120 is operating at or below an exemplary 2,000 ft AGL, the RA may offer range data from the autonomous aircraft 120 to the surface below. Especially during landing operations, the RA system may become a valuable source of AGL altitude information available to the object identification and positioning system 150 and the FMS 160.

However, each of the avionics suite 140 systems may possess inherent limitations. A GPS signal may be jammed or unavailable. A glideslope portion or the entirety of an ILS system may be inoperative requiring alternate procedures. Each of these limitations may require reliance on other positioning systems and sensors for the object identification and positioning system 150 to determine the precise position. Nevertheless, when operable, each of the avionics sensors 140 may offer valuable avionics sensor data 142 to the object identification and positioning system 150 to complement the precise position.

In one embodiment of the inventive concepts disclosed herein, the object identification and positioning system 150 may store the received sensor data in the MS database 174 within the storage. The MS database 174 may receive this new information and add the new information to historical object data. The historical object data may include specific attributes defining the object. For example, position, altitude, and size may be specific attributes defining an object. The object identification and positioning system 150 may compare the received sensor data to the historical object data and identify the sensed object based on the comparison. Should the object identification and positioning system 150 make a match between the sensed data and the historical data, the object identification and positioning system 150 may positively identify the object and, therefore, determine the precise position of the autonomous aircraft 120 relative to the sensed object.

Of note, each individual sensor within the sensor suite 130 may offer more accurate sensor data at differing ranges and altitudes. For example, at an altitude of 45,000 ft MSL (FL450), the GPS may be the most accurate of the sensors while at 110 ft AGL, the VS 132 may offer the most accurate set of data to the object ID and positioning system 150. Acting in concert, the sensor suite 130 may offer the precise positioning solution at all altitudes.

In one embodiment of the inventive concepts disclosed herein, the MS sensor suite may produce a data stream including an actual sensor return of a sensed object including each detail of an image without a perspective transformation. In this manner, the MS sensor suite 130 may produce a stream of raw data to the object ID and positioning system 150 to enable accurate positioning and trajectory. For example, an object sensed by one of the sensors within the sensor suite 130 may be on a distant horizon as viewed from the autonomous aircraft 120. To process the horizon object for a human display, the processor must rely on perspective transformation to make the distant object view normally for the human eye. This perspective transformation may require a compression of data causing a significant loss in fidelity and ultimately, an object that is unusable to the manned aircraft. Here, without a perspective transformation, the object ID and positioning system 150 may process the data stream in raw form without perspective transformation or fidelity loss and enable the object ID and positioning system 150 to accurately rely on the distant object for positioning and trajectory control.

FIG. 2 Sensor Data

Figure 2:
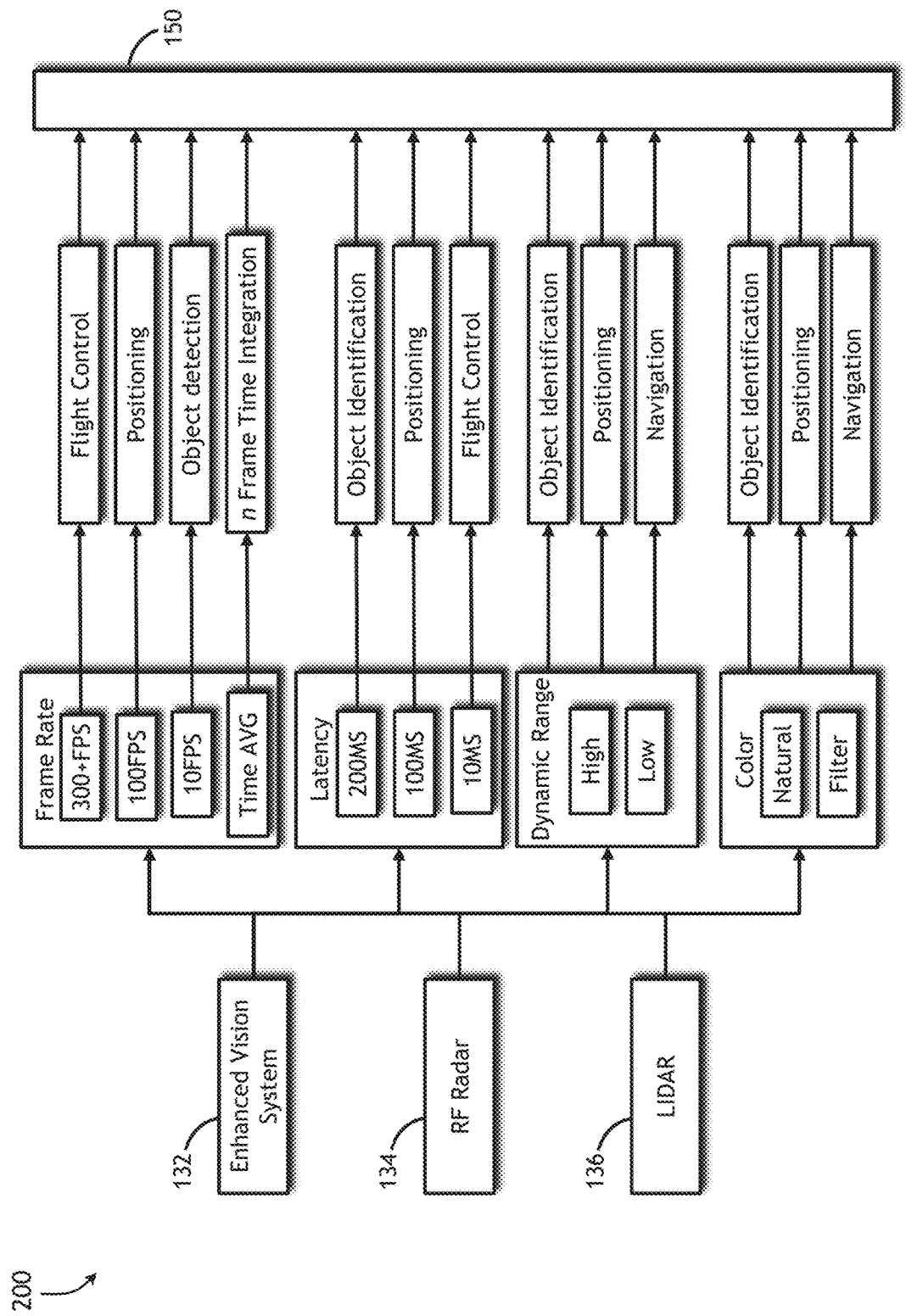
FIG. 2 is a diagram of sensor data details and purpose usable by an embodiment of the inventive concepts disclosed herein.

Referring now to FIG. 2, a diagram of sensor data details and purpose usable by an embodiment of the inventive concepts disclosed herein is shown. A diagram of sensor data details 200 may indicate data streams usable by the object ID and positioning system 150 in determining the precise position.

Frame Rate

In one embodiment of the inventive concepts disclosed herein, one or more sensors from the sensor suite 130 may send sensor data to the the object ID and positioning system 150 at frame rates that are proportional with a flight regime of the autonomous aircraft 120 (e.g., the operation and state). For example, at operations requiring more accurate positioning, (e.g., landing, low level flight) the object ID and positioning system 150 may command and process a higher frame rate (e.g., 300 FPS) than at a state of flight requiring lesser accuracy (e.g., cruise flight, medium altitude navigation) (e.g., 10 FPS).

Faster frame rates than may be traditionally displayed to a pilot may be easily analyzed the object ID and positioning system 150. Furthermore, the object ID and positioning system 150 may extract value from slower frame rates or increased integration times, or frame stacking, over time constants that are longer than acceptable to a human. Temporal integration, which normally causes image smear, may be beneficial to the object ID and positioning system 150 which may compensate from such smear, remove it completely, or compare it to frame history in real time.

For human consumption, traditional current HUD systems may display at approximately 30 frames per second (FPS) which may be considered a limit of human interpretation. However, current visual sensors (cameras) may produce data at 300 FPS.

In one embodiment of the inventive concepts disclosed herein, for flight control of the autonomous aircraft 120, the object ID and positioning system 150 may receive first sensor data from at least one first sensor of the autonomous aircraft sensor suite, the first sensor data including at least one first attribute of a sensed object. The first sensor data received at a first frame rate, the first frame rate suitable for a flight control of the autonomous aircraft. Here, the first frame rate may include an exemplary 300 FPS suitable for flight control of the autonomous aircraft 120.

In addition, for positioning information, the first sensor data may also be received at a second frame rate, the second frame rate suitable for a positioning of the autonomous aircraft. Here, a slower frame rate (e.g., 2-30 FPS) may allow the object ID and positioning system 150 more processing time for image analysis to correctly detect and identify the sensed object.

Further, the object ID and positioning system 150 may maintain a time average of the last n frames to aid the object ID and positioning system 150 in determining a position of the autonomous aircraft 120. This time integration of n frames may allow more detailed analysis for the object ID and positioning system 150 to dwell on the time integrated image. For example, a running time average of 10 to 30 frames may allow an increased amount of object ID and positioning system 150 analysis and correct identification of the sensed object. In this manner, the object ID and positioning system 150 may dwell on multiple views of the sensor FOV and make more informed analysis of the time averaged image.

In one example, the object ID and positioning system 150 may make time sensitive decisions for autonomous aircraft 120 flight control based on the fresh 300 FPS "snapshot" frame rate while dwelling on the stale 10-30 frame "video" of the sensed object to make a positioning or navigation decision.

In an additional embodiment of the inventive concepts disclosed herein, the object ID and positioning system 150 may receive second sensor data from at least one second sensor of the autonomous aircraft sensor suite, the second sensor data including at least one second attribute of the sensed object. Here, a second sensor from the sensor suite 130 may image the same sensed object as did the first sensor. With this dual imaging of the same object, the object ID and positioning system 150 may increase confidence of a positioning solution and therefore, increase accuracy of flight control commands.

For example, the object ID and positioning system 150 may command one or more of the sensors within the sensor suite 130 to detect, identify, and track a pattern of approach lights associated with a landing runway. In this manner, the object ID and positioning system 150 may, based on positioning and trajectory determinations derived from BRA measurements from the approach lights, command the autopilot to accurately fly the autonomous aircraft 120 relative to the approach lights.

Latency

As used herein, latency may include an amount of elapsed time from an image detection to the time the data is presented to a user of the data (data in to data out). Here the user of the data may include the object ID and positioning system 150. Latency may also refer to an elapsed time of a feedback for a control loop. For example, an elapsed time from sensor data in followed by a control surface movement and follow on autonomous aircraft 120 maneuver.

In one embodiment of the inventive concepts disclosed herein, the latency configured within the object ID and positioning system 150 may operate with time delays of a longer duration between sensor imaging and data delivery. In the manner, the object ID and positioning system 150 reaction times may compensate for this by limiting action until additional data may be received. In addition, more than one sensor of the sensor suite 130 may operate in synchrony comparing latent imagery with current (e.g., lower resolution, lower contrast) imagery to relieve the negative effect of latent imagery that may cause a negative control input.

In traditional manned aircraft, one FAA mandate requires a 100 ms latency between detection of sensed object and display of the sensed object to the pilot. A standard human reaction time may limit how fast information may be delivered. A longer latency 100+ ms may cause the human pilot to act based on stale information and therefore induce unsafe pilot induced oscillations.

In one embodiment of the inventive concepts disclosed herein, the sensor suite 130 may function to deliver the sensor data at a latency rate of 10 ms enabling the object ID and positioning system 150 to make earlier corrections to a trajectory deviation and smaller corrections required to correct the deviation. Here the object ID and positioning system 150 may command the flight controls 122 of the autonomous aircraft 120 based on the 10 ms latency value for quick object detection, accurate positioning, and early deviation detection.

Also, embodiments of the inventive concepts disclosed herein may anticipate an exemplary 200 ms latency for positioning compensated in a control loop if the object ID and positioning system 150 may anticipate a slower latency. For example, in one autonomous aircraft 120 a slower processor or slower flight control system may require a slower latency rate of data delivery. In this manner the object ID and positioning system 150 may be configurable to function with a plurality of different autonomous aircraft 120 types and models.

In one embodiment of the inventive concepts disclosed herein, the object ID and positioning system 150 may receive first sensor data at a first latency, the first latency suitable for a flight control of the autonomous aircraft. For flight control of the autonomous aircraft 120, a shorter latency may introduce sensor data and provide trajectory feedback to the object ID and positioning system 150 at a rate specifically suited for aircraft flight. In flight, the autonomous aircraft 120 may require immediate correction to a flight path and trajectory requiring immediate movement of a flight control surface to affect the correction. A slower latency may induce error which may cause incorrect trajectory and ultimately, an undesirable oscillated flight path.

Further, the first sensor data may also be received at a second latency, the second latency suitable for a positioning of the autonomous aircraft. For example, a 100 ms latency value may find function with the object ID and positioning system 150 as usable for positioning of the autonomous aircraft 120 while a longer exemplary value of 200 ms may function for object identification. As ID and positioning may require a lesser time sensitive analysis than a flight control, a longer second latency value may allow for accurate positioning of the autonomous aircraft 120.

Dynamic Range

In one embodiment of the inventive concepts disclosed herein, the object ID and positioning system 150 may be configured to receive and process sensor data with an unlimited dynamic range. The object ID and positioning system 150 may be configured to receive a second sensor data within a first dynamic range suitable for object detection and identification. The object ID and positioning system 150 may also receive the second sensor data within a second dynamic range suitable for navigation of the autonomous aircraft 120.

For example, the first dynamic range may be an exemplary plus or minus 100 dB and the second dynamic range may be an exemplary plus or minus 50 dB. In this manner, the object ID and positioning system 150 may function receiving sensor data of a variety of dynamic ranges limited only by sensor performance.

In embodiments, a power of the processor 152 may be one variable for which a dynamic range may be specifically tailored. For example, to lessen a size, weight, and power requirements of the processor 152, the operator may decide to limit the processor capability and therefore limit the dynamic range of the sensor data to a specific range of values. However, greater detail may be desired by an operator choosing a processor 154 with greater capabilities offering a greater detail within a high dynamic range data stream and a faster determination of positioning and trajectory.

Color

In one embodiment of the inventive concepts disclosed herein, the sensor suite 130 may include sensors configured for sensing unlimited color. This transmission of a sensor data including object attributes of unlimited color may allow the object ID and positioning system 150 to detect and identify sensed objects efficiently and accurately. Sensor data may include natural color as well as wavelength filters in a broader sense (enabling emissivity or RCS discrimination of relevant image features). For example, the color sensors within the sensor suite 130 may discern runway threshold lights (green) from runway centerline lights (white) and side row bars (red). Also, the object ID and positioning system 150 may discern white runway markings from darker pavement enabling the object ID and positioning system 150 to command autopilot flight to a specific aimpoint on the landing runway.

In one embodiment of the inventive concepts disclosed herein, the object ID and positioning system 150 may receive second sensor data from a second sensor of the sensor suite 130, the second sensor data including at least one second attribute of the sensed object. The second sensor data may be received within a first color spectrum, the first color spectrum suitable for an object identification. The second sensor data also received within a second color spectrum, the second color spectrum suitable for a navigation of the autonomous aircraft.

For example, the first color spectrum may include a wavelength of 100 to 699 nanometers (nm) and the second color spectrum includes a wavelength of 700 to 1500 nm.

In one exemplary embodiment, the object ID and positioning system 150 may function using an external trigger of image acquisition. In this manner, one sensed object may trigger an opportunity for sensing of a follow-on object to enable the object ID and positioning system 150 more timely detection of a desired object along a route. Further an asynchronous flow of object anticipation may provide the object ID and positioning system 150 with object identification and advantageous performance. These exemplary advantages may be applied to configuration and parameters on the focal plane or camera assemblies as well as a portion of the hardware design of the focal plane.

FIG. 3 Logic Flow

Figure 3:
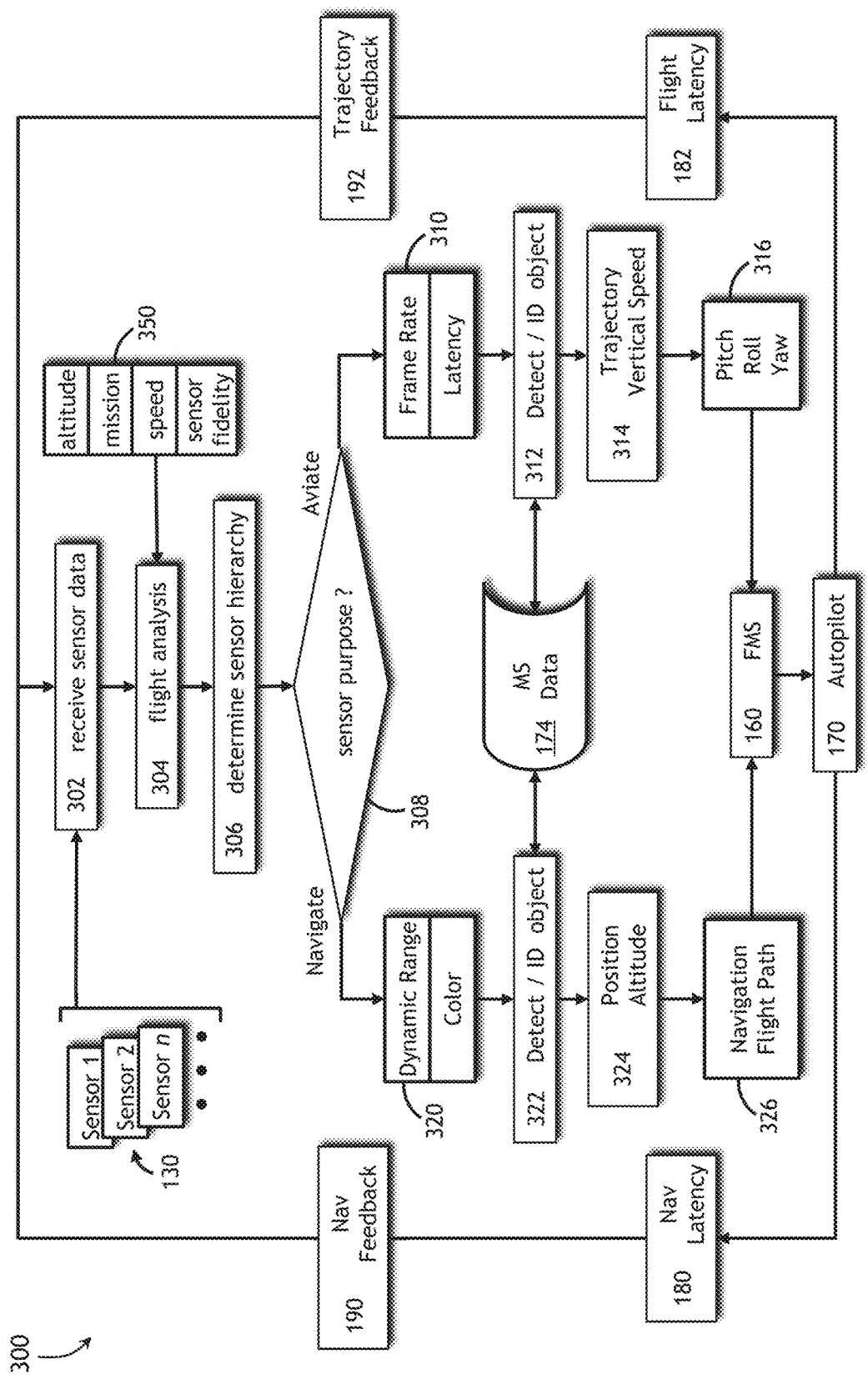
FIG. 3 is a logic flowchart of an exemplary embodiment of the inventive concepts disclosed herein.

Referring now to FIG. 3, a logic flowchart of an exemplary embodiment of the inventive concepts disclosed herein is shown. MS system logic flow 300 may indicate one exemplary logic flow of the object ID and positioning system 150. A step 302 may include receiving sensor data from one or more sensors from the sensor suite 130. As above, the sensor data may include one or more attributes of the sensed object. A step 304 may include a flight analysis based on the plurality of factors including altitude, mission, speed and sensor fidelity, etc. The object ID and positioning system 150 may use the flight analysis 304 for follow on action such as, step 306, the object ID and positioning system 150 may determine a sensor hierarchy to align the sensors in one or more orders of hierarchy from which to proceed with sensor data analysis.

In one embodiment of the inventive concepts disclosed herein, the object identification and positioning system 150 may employ a hierarchy of data sets from which to fuse to determine the most accurate precise position for the specific phase of flight. The above example with the autonomous aircraft 120 at FL450 may illustrate the GPS being an accurate sensor from which the object ID and positioning system 150 may derive the precise position at higher altitudes. At lower altitudes, the object identification and positioning system 150 may alter the hierarchy of sensor data sets. For example, at 5,000 ft AGL, the RF RADAR system 134 may offer accurate positioning data fused with GPS data to the object identification and positioning system 150. At 1,000 ft AGL, the VS 132 fused with the RA may offer a most accurate set of data to the object identification and positioning system 150.

In one embodiment of the inventive concepts disclosed herein, the object ID and positioning system 150 may determine the sensor hierarchy based on the flight analysis of a plurality of factors. An altitude as discussed above may be one factor while a mission may be another. For example, one mission profile may be a low altitude point to point navigation to deliver a package. In this low altitude situation, one sensor hierarchy may include the RA and LIDAR system 136 near the top of the sensor hierarchy.

Autonomous aircraft 120 speed may be another element for flight analysis to determine the sensor hierarchy. At high speeds, the GPS may be a most accurate sensor while at lower speeds the RF RADAR system 134 may be the most accurate. Sensor fidelity may offer another factor to which the object ID and positioning system 150 may reference for establishing the sensor hierarchy. Should the object ID and positioning system 150 determine that a sensor becomes unreliable due to that sensor producing data outside of a normalized position as determined by an analysis of data received by the remaining sensors within the sensor suite 130, the object ID and positioning system 150 may place that unreliable or inaccurate sensor lower on the sensor hierarchy.

The below table may illustrate one exemplary altitude-based and flight analysis-based hierarchy of sensor ranked by the object identification and positioning system 150:

| Altitude AGL | Phase of Flight | Sensor Hierarchy |
| --- | --- | --- |
| >10,000 | Cruise | GPS |
|  |  | IRS |
|  |  | Maps |
| 5,000 | Cruise/Descent | GPS |
|  |  | RF RADAR |
| 2,000 | Approach | LIDAR |
|  |  | RF RADAR |
|  |  | GPS |
| 500 | Short Final | VS |
|  |  | RA |
|  |  | GPS |
|  |  | ILS |
| 50 | Landing | VS |
|  |  | RA |
|  |  | ILS |

Here, one sensor hierarchy may be altitude based while another may be mission, speed, and/or sensor fidelity based. Regardless of the basis for hierarchy, the object identification and positioning system 150 may identify which sensor may be the most accurate as well as which sensors are worthy of analysis. For example, at FL450, the RA may be nearly useless as range to the surface may be too distant for the RA to receive useable data.

The object ID and positioning system 150 may also use autonomous aircraft 120 configuration and status 246 to aid in determining the sensor hierarchy. For example, should the autonomous aircraft 120 have the landing gear down with the RA reporting 200 ft AGL, the object ID and positioning system 150 may determine the autonomous aircraft 120 is ready for landing and appropriately order the sensor hierarchy and therefore, the received sensor data for analysis.

A step 308 may include a query of whether and the purpose of the sensor data may be for aviation or navigation. For aviation, the logic may continue at a step 310 with determining a frame rate and a latency for which the object ID and positioning system 150 may desire reception of the sensor data.

A step 312 may reference the MS database 174 to determine if the sensor data attribute matches data within the MS database 174. If a match, the object ID and positioning system 150 may detect and identify the sensed object. IF not, the object ID and positioning system 150 may function to update the MS database 174 with the new attribute of the sensed object. To identify the sensed object, the object ID and positioning system 150 may analyze a difference between the first attribute and the second attribute of the sensed object. Here the difference may include a diversity in a frequency, a wavelength, a temperature, and a bandwidth.

A step 314 may determine both the trajectory and vertical speed of the autonomous aircraft 120. Here, a 3-D vector of the autonomous aircraft 120 relative to the datum may function as each of the trajectory and vertical speed. A step 316 may determine proper commands in three axis of autonomous aircraft 120 flight including pitch roll and yaw. Commands may then be sent to the FMS 160 for autopilot 170 actuation of the flight controls 122.

For Navigation purposes, the logic may determine a dynamic range and color of the desired sensor data at a step 320. As before in step 312, the object ID and positioning system 150 may detect and ID the sensed object at a step 322 with reference to the MS database 174. The object identification and positioning system 150 may function to identify the sensed object based on the identification of the attributes of the object. In a comparison of historical attributes to sensed attributes in steps 312 and 322, the object identification and positioning system 150 may operate to identify the sensed object.

A step 324 may determine the position and altitude of the autonomous aircraft 120 again relative to the sensed object and relative to the datum. A step 326 may operate to determine a desired point to which the autonomous aircraft 120 will navigate and a desired flight path to complete the navigation. As before, the FMS 160 and autopilot 170 function to fly the autonomous aircraft 120.

Flight latency 182 may function as a control loop using trajectory feedback 192 of the autonomous aircraft 120 to the object ID and positioning system 150 to ensure the autonomous aircraft 120 is maneuvering as desired. As discussed above, a fast feedback (10 ms latency) may allow accurate flight control actuation and accurate autonomous aircraft 120 maneuver. Similarly, navigation latency 180 (100-200 ms latency) may function with navigation feedback 190 to ensure the autonomous aircraft 120 flight path is accurate to the object ID and positioning system 150 commanded flight path. This slower latency value for navigation may balance accurate navigation requirements with processor 152 capability.

FIG. 4 Method Flow

Figure 4:
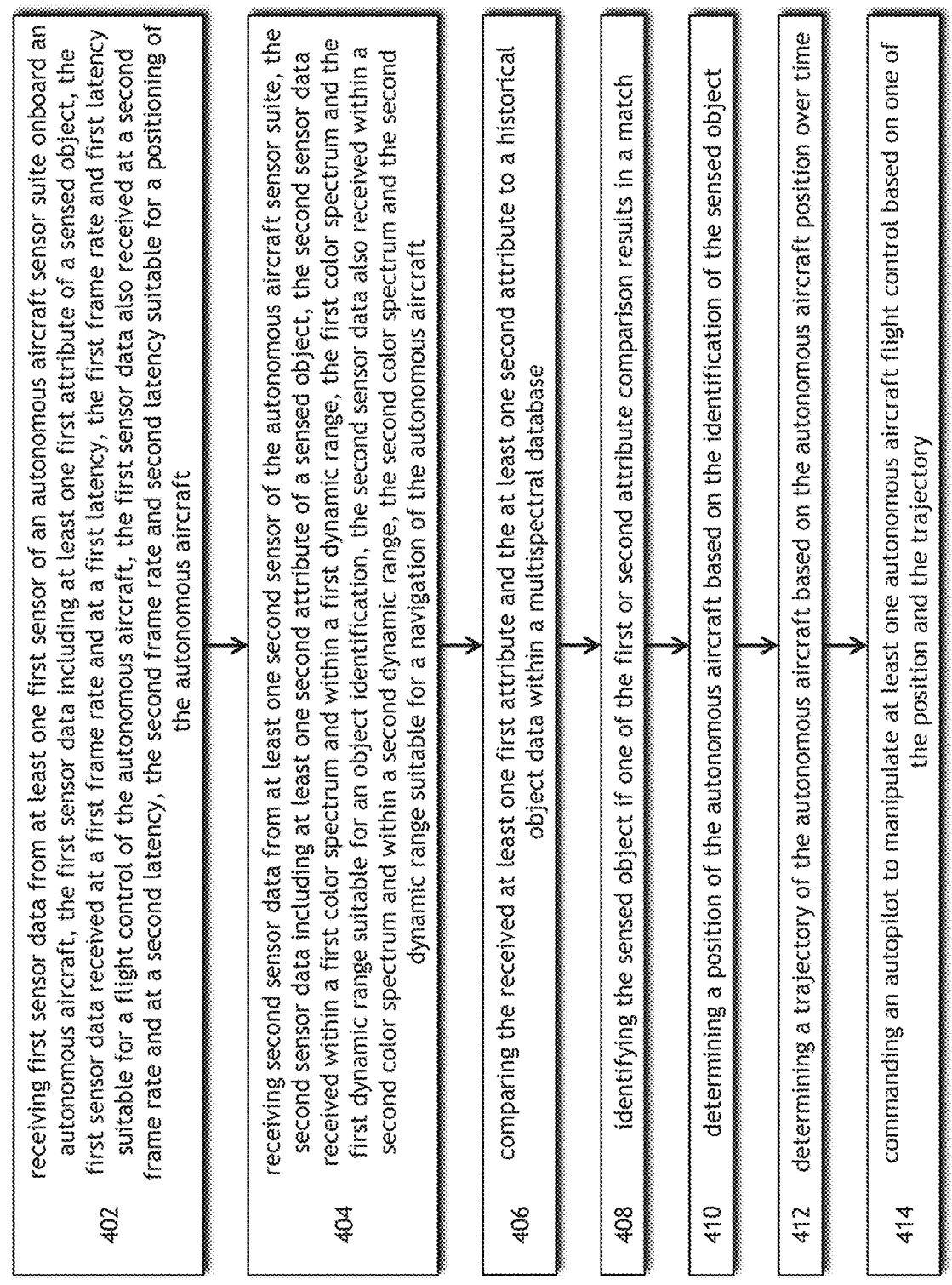
FIG. 4 is a diagram of method steps exemplary of one embodiment of the inventive concepts disclosed herein.

Referring now to FIG. 4, a diagram of method steps exemplary of one embodiment of the inventive concepts disclosed herein is shown. MS enhanced database method flow 400 may include exemplary steps for a method for MS object identification. A step 402 may include receiving first sensor data from at least one first sensor of an autonomous aircraft sensor suite 130 onboard an autonomous aircraft 120, the first sensor data including at least one first attribute of a sensed object, the first sensor data received at a first frame rate and at a first latency, the first frame rate and first latency suitable for a flight control of the autonomous aircraft 120, the first sensor data also received at a second frame rate and at a second latency, the second frame rate and second latency suitable for a positioning of the autonomous aircraft 120.

A step 404 may include receiving second sensor data from at least one second sensor of the autonomous aircraft sensor suite 130, the second sensor data including at least one second attribute of the sensed object, the second sensor data received within a first color spectrum and within a first dynamic range, the first color spectrum and the first dynamic range suitable for an object identification, the second sensor data also received within a second color spectrum and within a second dynamic range, the second color spectrum and the second dynamic range suitable for a navigation of the autonomous aircraft 120.

The method may, at a step 406, compare the received at least one first attribute and the at least one second attribute to a historical object data within a multispectral database 174.

A step 408 may include identifying the sensed object if one of the first or second attribute comparison results in a match. The object ID and positioning system 150 may analyze a plurality of attributes of the sensed object from a plurality of diverse sensors within the sensor suite 130 to correctly identify the sensed object for accurate positioning and trajectory. In addition, the object identification and positioning system 150 may compare the sensed attribute with the historical object data within the MS database 174, the comparison including a percentage-based threshold match of a totality of object attributes. Here, a higher percentage of matching attributed may rise to an accurate identification of the sensed object while the object identification and positioning system 150 may set a threshold percentage below which the sensed object will be discarded in favor of a higher percentage match of object attributes.

A step 410 may include determining a position of the autonomous aircraft based on the identification of the sensed object. The object ID and positioning system 150 may operate to filter each data stream in accordance with the flight analysis and the sensor hierarchy as well as function to carry out 3D triangulation calculations to determine the autonomous aircraft 120 precise position and altitude (AGL and MSL).

In embodiments, the object ID and positioning system 150 may determine a position and trajectory of the autonomous aircraft 120 relative to the sensed object and a position and trajectory relative to the datum. In this manner, the object ID and positioning system 150 may determine the autonomous aircraft 120 position relative to the sensed object regardless what the sensed object is (e.g., a runway, an aircraft, an oil rig). The object ID and positioning system 150 may function to fly the autonomous aircraft 120 relative to the runway and command the autonomous aircraft 120 to land as well as maintain a relative position in formation with another aircraft and maneuver the autonomous aircraft 120 relative to the other aircraft.

A step 412 may include determining a trajectory of the autonomous aircraft based on the autonomous aircraft position over time. A step 414 may include commanding an autopilot to manipulate at least one autonomous aircraft flight control 122 based on one of the position and the trajectory.

Figure 5:
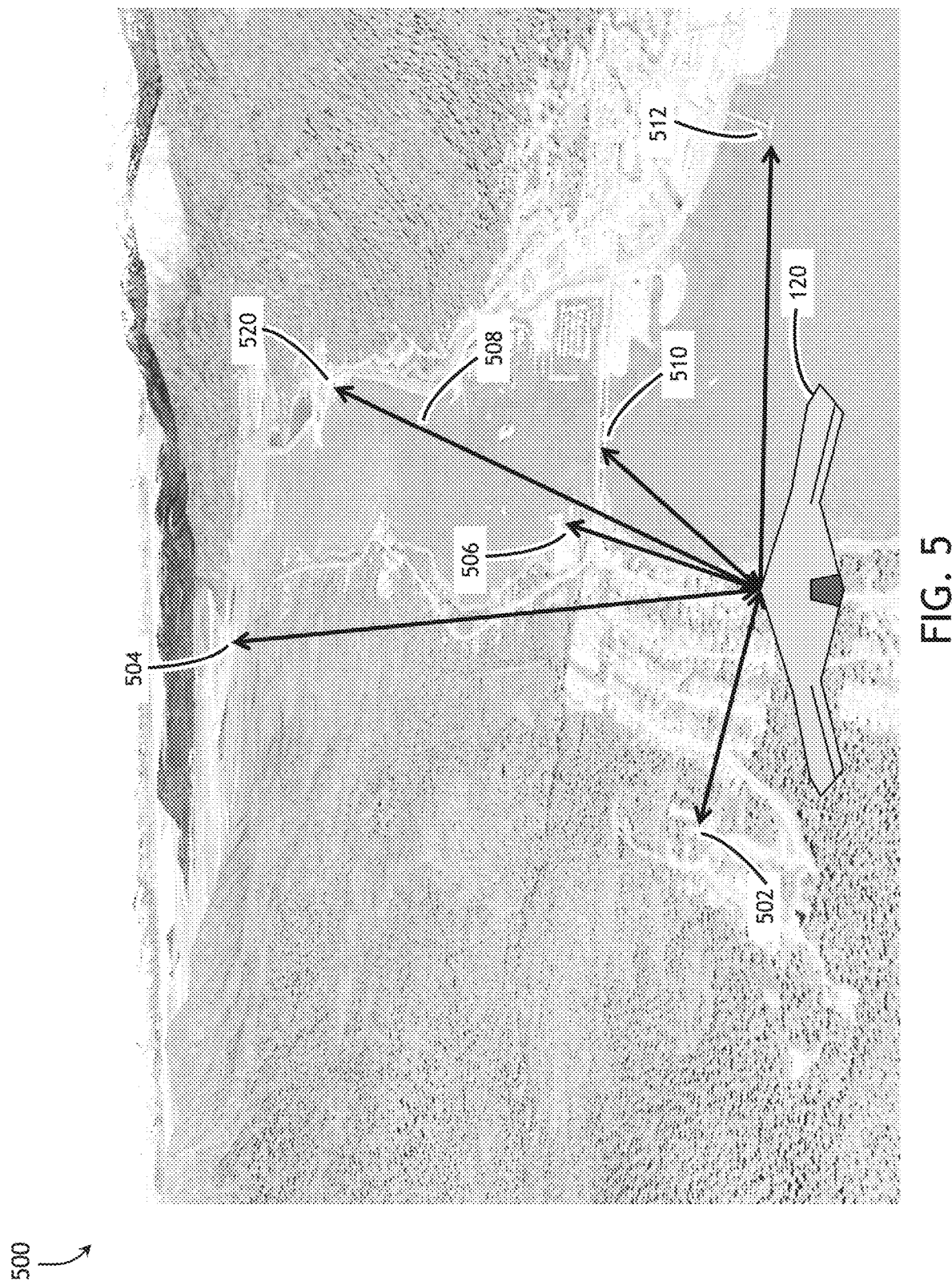
FIG. 5 is a diagram of an arrival view in accordance with one embodiment of the inventive concepts disclosed herein.

FIG. 5 Arrival View

Referring now to FIG. 5, a diagram of an arrival view in accordance with one embodiment of the inventive concepts disclosed herein is shown. An arrival view 500 may portray objects available to the sensor suite 120 for use in positioning of the autonomous aircraft 120. Here, a plurality of objects within view of the sensors may include optically significant objects, RADAR significant objects, and LIDAR significant objects. A sensor line of sight (LOS) 508 may indicate an area of interest for one or more of the sensors. Of note, each sensor may maintain a FOV much greater than a current LOS. Contemplated herein, a sensor FOV may be a 360-degree spherical coverage around the autonomous aircraft 120 with antenna elements mounted in a variety of positions on the autonomous aircraft 120/

Sensor LOS 508 may enable one or more of the sensors to image sensor significant ground objects such as a neighborhood 502 as well as a Juneau PAJN RW26 threshold 504. A marina 506 may offer a warm weather object however, a bridge center 510 and a pier-T 512 may be sensed year-round.

Of note, many objects may not be mutually exclusive to a single sensor within the sensor suite 122. For example, a visually significant object may also be LIDAR significant while a RADAR significant object may also be an identifiable map object. Each of the sensors within the sensor suite 122 may operate individually to sense each of the significant objects within view to provide sensor data to the object ID and positioning system 150.

Figure 6:
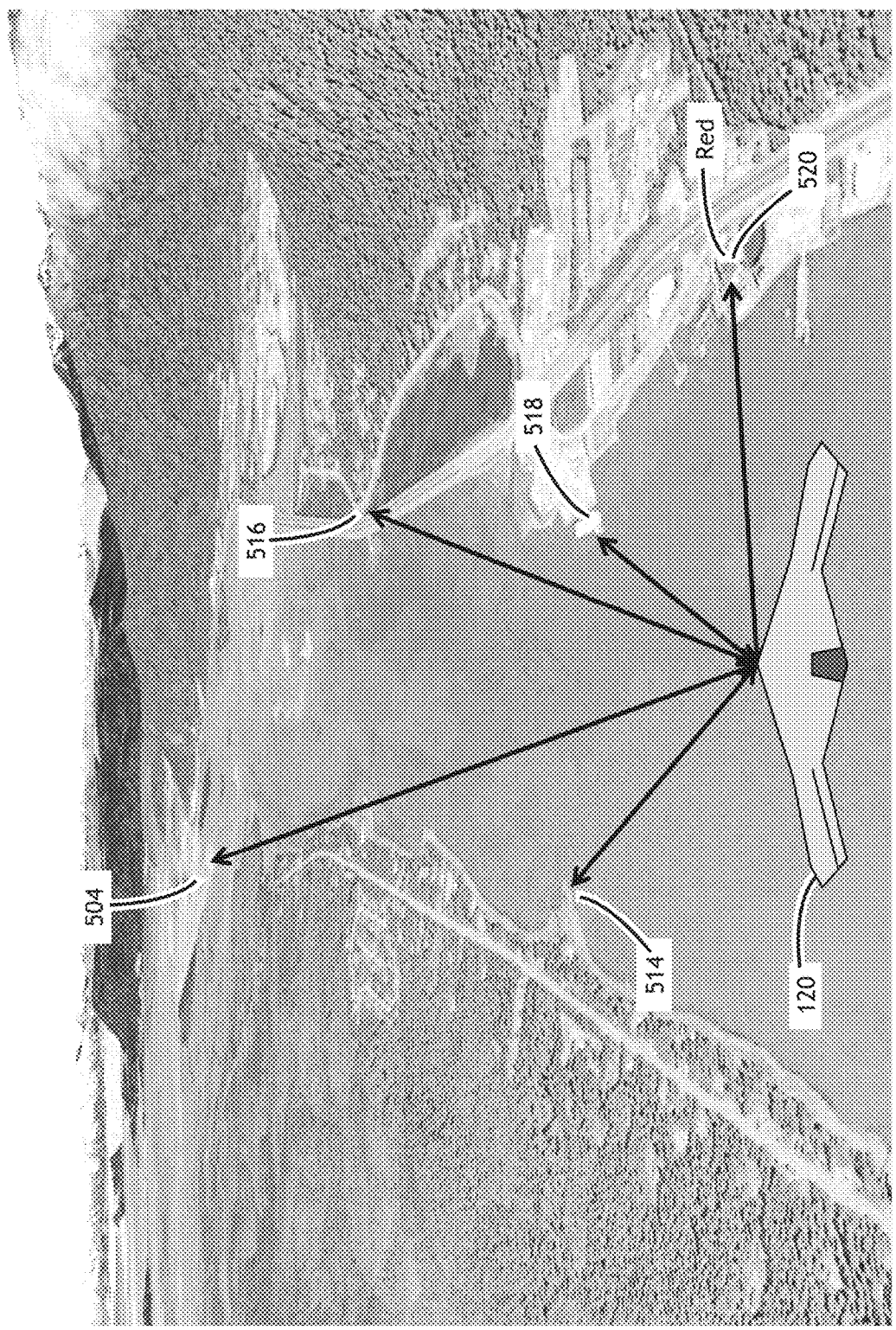
FIG. 6 is a diagram of an approach view of an exemplary embodiment of the inventive concepts disclosed herein.
Figure 7A:
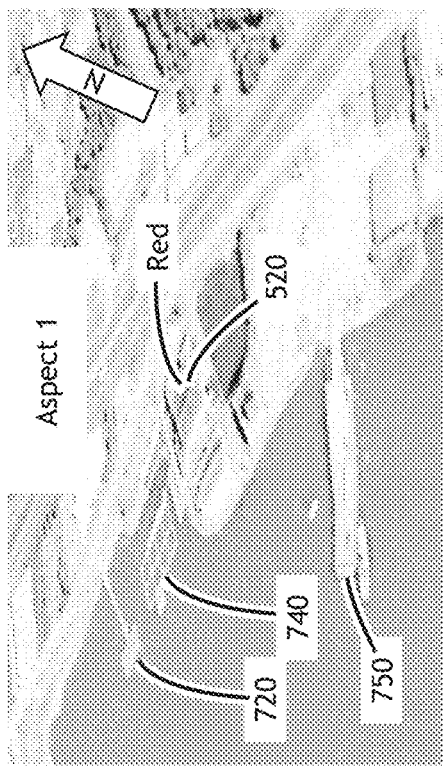
FIG. 7A-7D are diagrams of a series of aspect views associated with one embodiment of the inventive concepts disclosed herein.
Figure 7B:
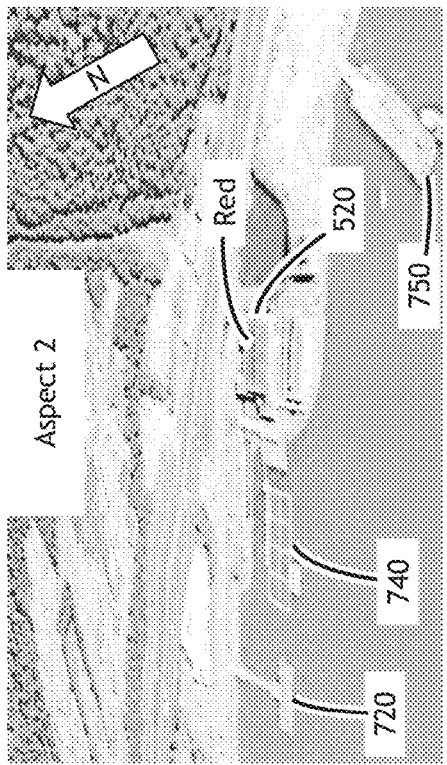
Figure 7C:
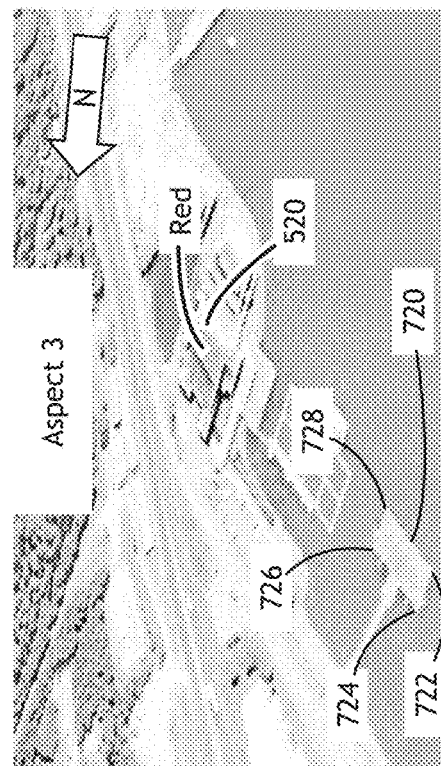
Figure 7D:
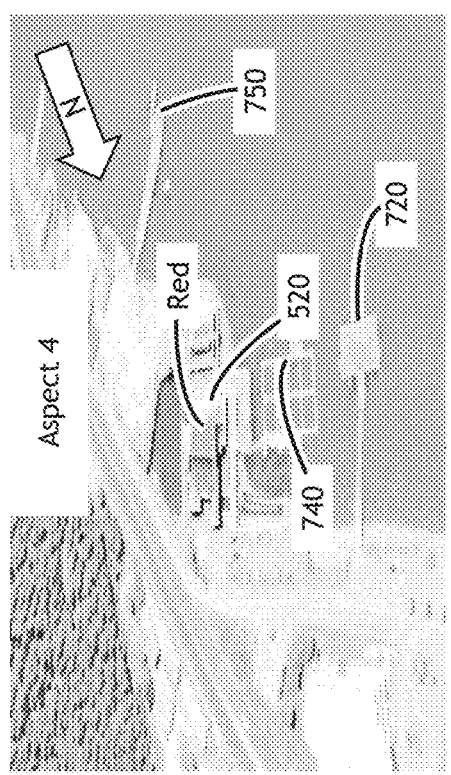

FIG. 6 Approach View

Referring now to FIG. 6, a diagram of an approach view of an exemplary embodiment of the inventive concepts disclosed herein is shown. Approach view 600 may indicate each object available to the sensor suite 130 for identification and precise positioning of the autonomous aircraft 120. Objects on approach to PAJN may include a land mass 514, a road junction 516, a ship dock 518, and a salmon hatchery 520 with a red colored roof with a wavelength of approximately 700 nm. Here, the salmon hatchery 520 may be an example of an object having attributes sensible by more than one sensor within the sensor suite 130. An optical sensor may image the red color of the roof while a LIDAR sensor may image the shape of the building and the RF RADAR sensor may image the vertical corners of the building. The object ID and positioning system 150 may use each of these attributes to detect and identify the sensed building and accurately determine the autonomous aircraft 120 position based on a triangulation of BRA data as well as a synthesis of sensor data from the plurality of sensors.

FIG. 7 Multiple Aspect Views

Referring now to FIG. 7, a series of diagrams of aspect views 700 associated with one embodiment of the inventive concepts disclosed herein is shown. The four exemplary aspects FIG. 7A-7D may indicate a view from the autonomous aircraft 120 as it passes the object (red roof salmon hatchery 520) on an approach to PAJN RW26 504. As the autonomous aircraft 120 approaches building 520 from the south, the sensor suite 130 may image a boat dock 720, hatchery ponds 740, and a long pier 750. As the autonomous aircraft 120 maintains a heading of approximately 280 degrees magnetic, the aspect of the salmon hatchery 520 may change. FIG. 7B indicates a view of a southwest face of the salmon hatchery 520. FIG. 7C indicates a northwest face of the salmon hatchery 520, and FIG. 7D may indicate a 90-degree relative view of the northwest face of the salmon hatchery 520.

Referring back to FIG. 7C, each corner of the boat dock 720 may be sensed by one or more of the sensors as the autonomous aircraft 120 passes. A boat dock corner west 722, a boat dock corner northwest 724, a boat dock corner northeast 726, and a boat dock corner southeast 728 may each aid the object ID and positioning system 150 in positioning of the autonomous aircraft 120. The object ID and positioning system 150 may receive the attributes of each corner and based on the alignment of each corner relative to the other corners over time, the object ID and positioning system 150 may determine the position and trajectory of the autonomous aircraft 120.

In embodiments, the object ID and positioning system 150 may store multiple views of the objects within the MS database 174 to make decisions based on the stored views as compared to the received sensor data.

FIG. 8 Approach

Figure 8:
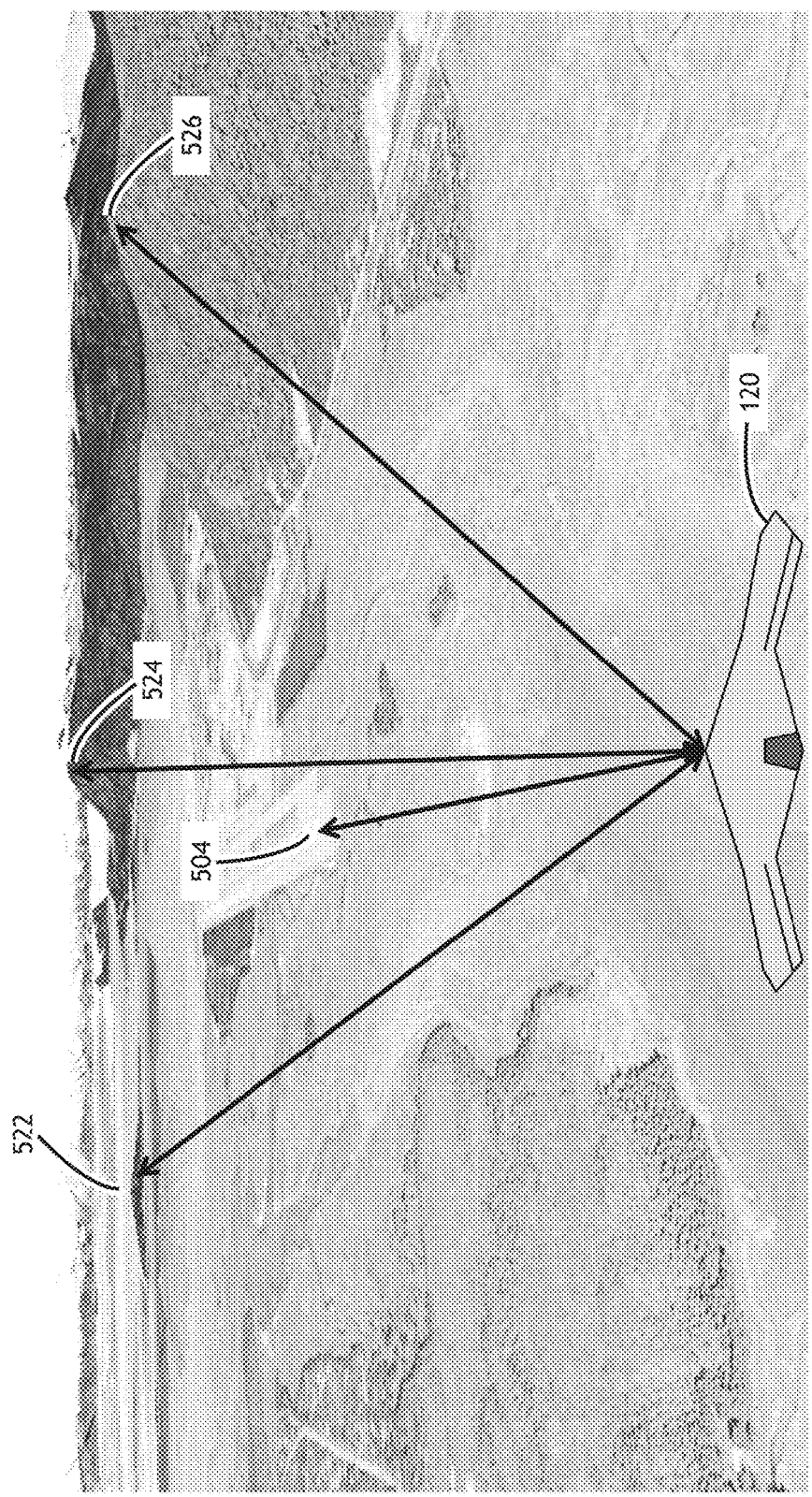
FIG. 8 is a diagram of a final approach view exemplary of one embodiment of the inventive concepts disclosed herein.

Referring now to FIG. 8, a diagram of a final approach view exemplary of one embodiment of the inventive concepts disclosed herein is shown. A final approach view 800 may offer the object ID and positioning system 150 a sensor LOS 508 of Coghlan island 522, Auke hill 524, and Juneau hill 526. As the autonomous aircraft 120 proceeds closer to PAJN RW26 504, each of these sensed objects may aid the object ID and positioning system 150 in maintaining accurate positioning and trajectory control.

FIG. 9 Short Final

Figure 9:
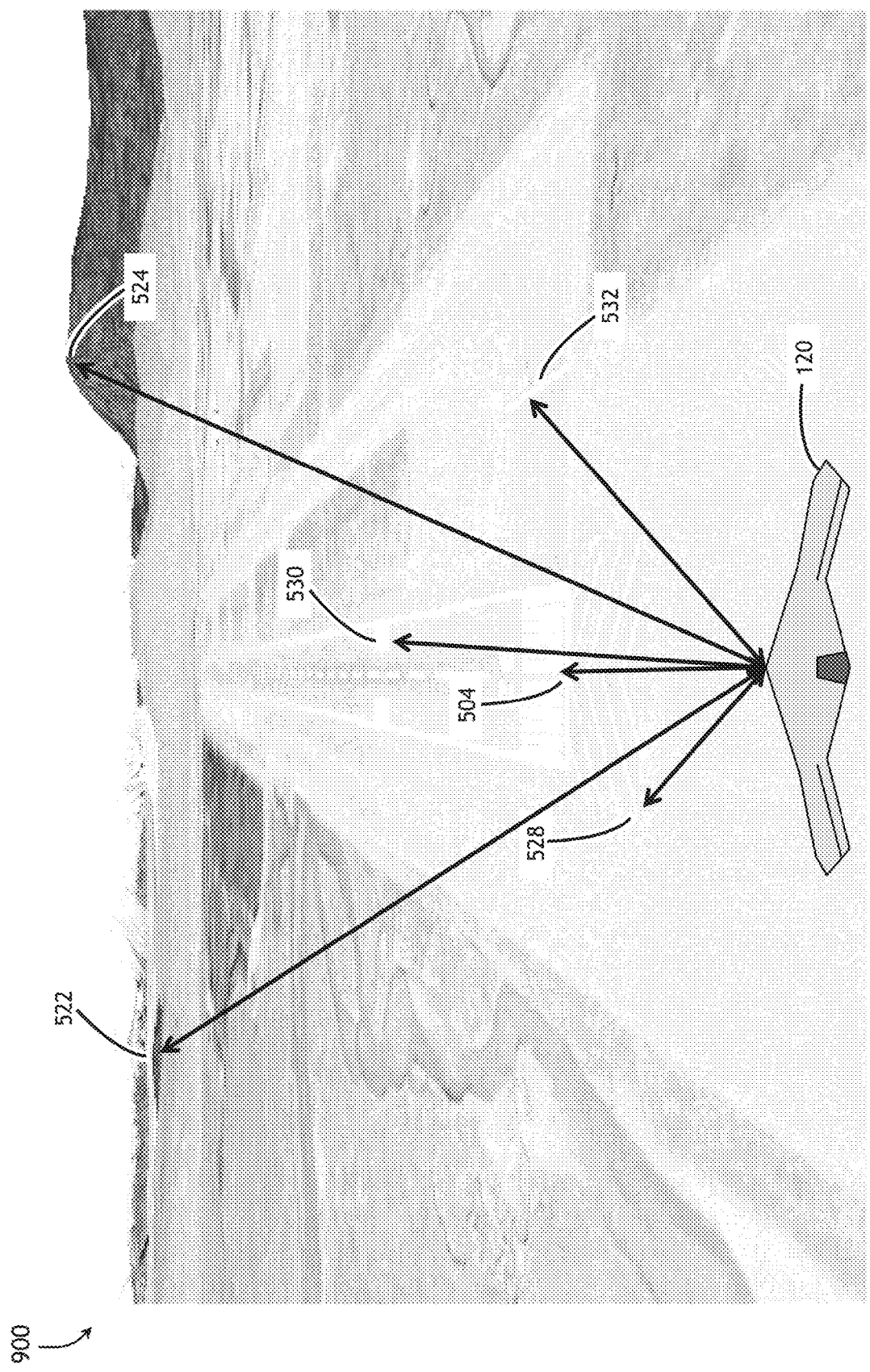
FIG. 9 is a diagram of a short final view exemplary of one embodiment of the inventive concepts disclosed herein.

Referring now to FIG. 9, a diagram of a short final view exemplary of one embodiment of the inventive concepts disclosed herein is shown. The short final view 900 may include runway specific objects as well as distant objects sensed previously. Coghlan island 522 and Juneau hill 526 are still available for the object ID and positioning system 150 to determine a position. On short final, blast pad markings corner 528, aiming point markings 530, and hold short line 532 may be visible to the optical sensor when meteorological conditions may permit.

Figure 10:
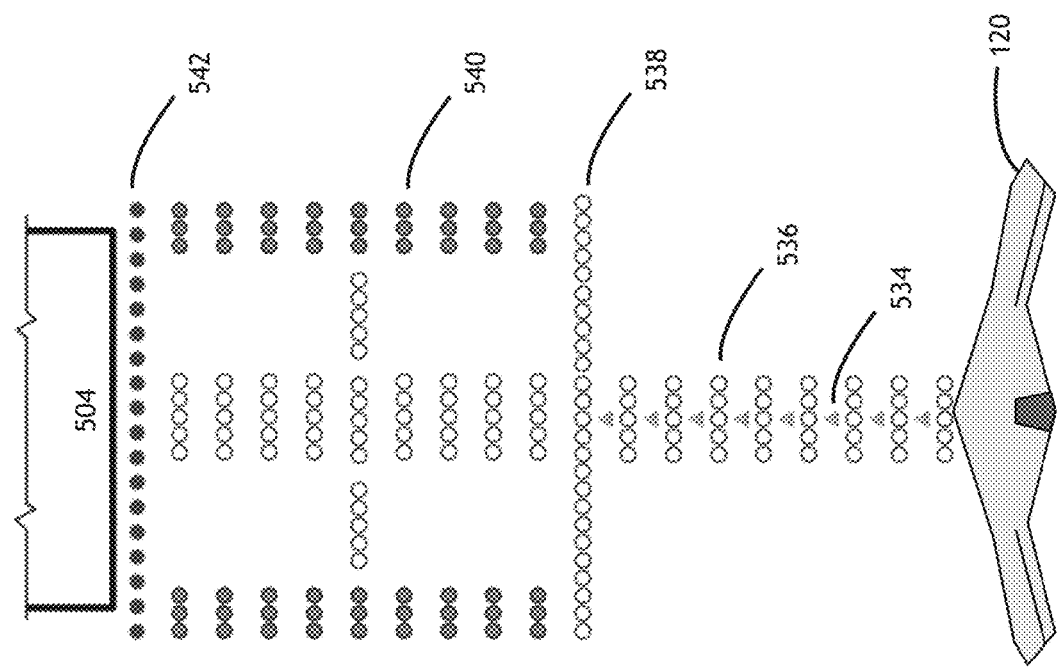
FIG. 10 is a diagram of approach lights associated with one embodiment of the inventive concepts disclosed herein.

FIG. 10 Approach Lights

Referring now to FIG. 10, a diagram of approach lights associated with one embodiment of the inventive concepts disclosed herein is shown. During certain environments, the object ID and positioning system 150 may use the approach lights 1000 system for object data. Optical sensors within the sensor suite 130 may image an individual light within the approach lights 1000 during both day and night operations. Since the lights maintain a colored cover, the object ID and positioning system 150 may discern a green cover from a red or white cover during day as well as night. White lights may include sequenced flashing white 534, centerline bars white 536, a 1000 ft bar white 538 while red may include a side row bar red 540. Approaching the runway, threshold green 542 lights may indicate the beginning of prepared surface.

Figure 11:
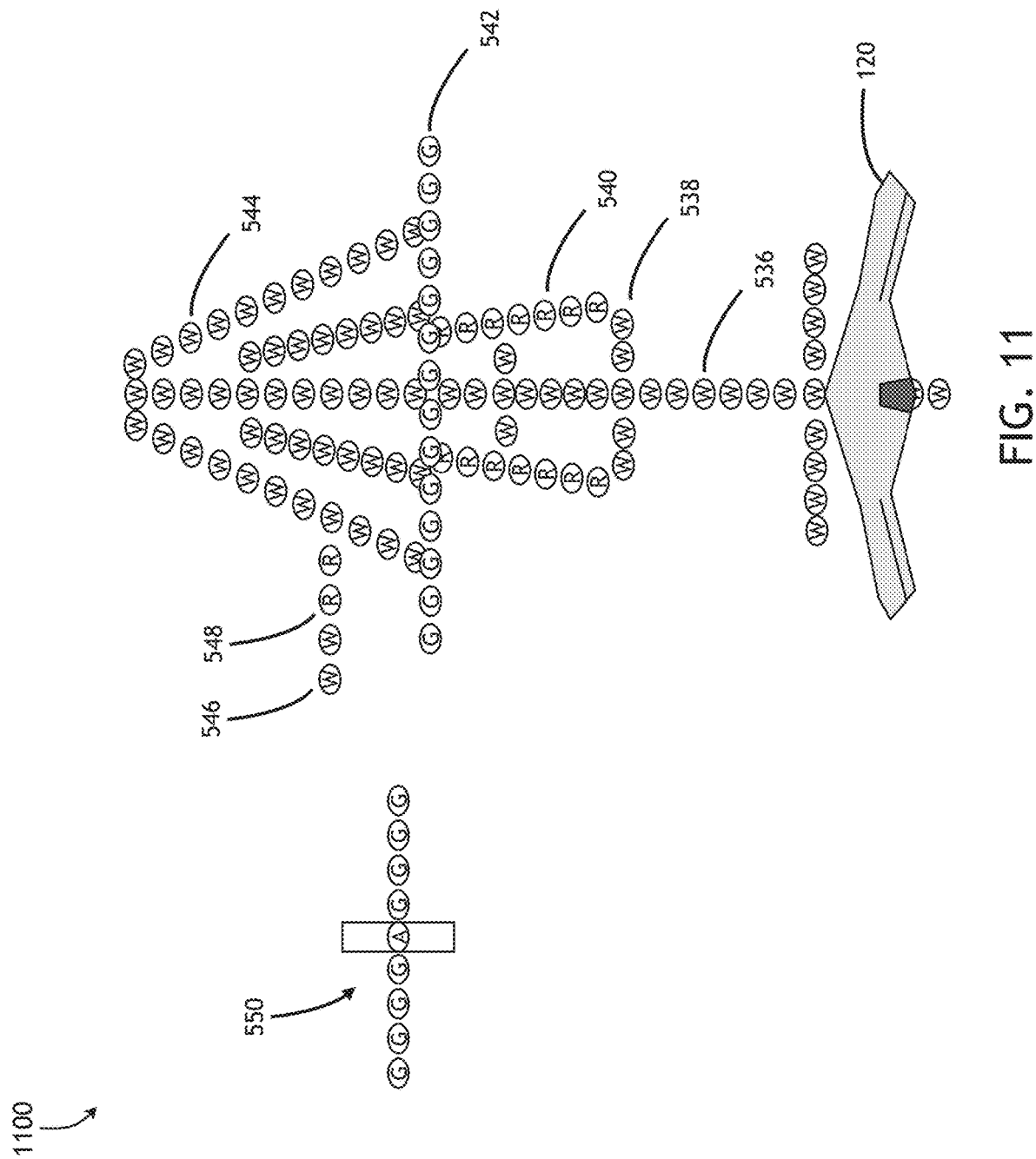
FIG. 11 is a diagram of runway lights and guidance systems associated with one embodiment of the inventive concepts disclosed herein.

FIG. 11 Landing Lights

Referring now to FIG. 11, a diagram of runway lights and guidance systems associated with one embodiment of the inventive concepts disclosed herein is shown. Runway lights 1100 may include runway edge white lights 544. For glideslope guidance, a Precision Approach Path Indicator (PAPI)/Visual Approach Slope Indicator (VASI) white lights 546 and a PAPI/VASI red lights 548 may indicate to a human pilot an accurate glideslope. However, the object ID and positioning system 150 may also discern the color of the PAPI lights offering the object ID and positioning system 150 the ability to maintain a visual glideslope while on approach. Furthermore, the object ID and positioning system 150 may command the autopilot 170 to fly a carrier based visual glidepath indicated by a USN optical landing system 550. Here, should the amber in the center align with the row of green, the autonomous aircraft 120 is on a proper glidepath. However, if the amber is high or low, the autonomous aircraft 120 is also high or low.

CONCLUSION

As will be appreciated from the above, a system and related method for configuring a suite of MS sensors to deliver high-performance sensor data to a processor driven ID and positioning system. The onboard systems may process the high-performance sensor data and determine a position and trajectory usable by the advanced autonomous aircraft FMS for autonomous aircraft control.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for multispectral object identification, comprising:
    a multispectral (MS) sensor suite onboard an autonomous aircraft including at least one of: a vision system (VS), a radio frequency (RF) radio detection and ranging (RADAR) system, and a laser imaging detection and ranging (LIDAR) system;
    an object identification and positioning system associated with the MS sensor suite, the object identification and positioning system including at least one processor and a storage;
    a MS database within the storage configured to communicate with the at least one processor, the MS database including a plurality of historical object data defining an associated plurality of objects;
    a tangible, non-transitory memory within the storage configured to communicate with the at least one processor, the tangible, non-transitory memory having instructions stored therein that, in response to execution by the at least one processor, cause the at least one processor to:
        receive first sensor data from at least one first sensor of the autonomous aircraft sensor suite, the first sensor data including at least one first attribute of a sensed object;
            the first sensor data received at a first frame rate and at a first latency, the first frame rate and first latency suitable for a flight control of the autonomous aircraft;
            the first sensor data also received at a second frame rate and at a second latency, the second frame rate and second latency suitable for a positioning of the autonomous aircraft;
        receive second sensor data from at least one second sensor of the autonomous aircraft sensor suite, the second sensor data including at least one second attribute of the sensed object;
            the second sensor data received within a first color spectrum and within a first dynamic range, the first color spectrum and the first dynamic range suitable for an object identification;
            the second sensor data also received within a second color spectrum and within a second dynamic range, the second color spectrum and the second dynamic range suitable for a navigation of the autonomous aircraft;
        compare the received at least one first attribute and the at least one second attribute to the historical object data;
        identify the sensed object if one of the first or second attribute comparison results in a match;
        determine a position of the autonomous aircraft based on the identification of the sensed object;
        determine a trajectory of the autonomous aircraft based on the autonomous aircraft position over time;
        command an autopilot to manipulate at least one autonomous aircraft flight control based on one of the position and the trajectory.

2. The system for multispectral object identification of claim 1, wherein the VS further includes a color sensor, an infrared sensor, a temperature sensor, and a texture sensor.

3. The system for multispectral object identification of claim 1, wherein the first frame rate further includes a time averaging and a time integration of the received at least one first and second attributes of the sensed object.

4. The system for multispectral object identification of claim 1, wherein the first frame rate and second frame rate are proportional with a flight regime of the autonomous aircraft, and wherein the first frame rate is at least approximately 30 frames per second (FPS) and the second frame rate is at least approximately 2 FPS.

5. The system for multispectral object identification of claim 1, wherein the first color spectrum includes a wavelength of 400 to 750 nanometers (nm) and the second color spectrum includes a wavelength of 751 to 2000 nm.

6. The system for multispectral object identification of claim 1, wherein the first latency is at least 10 milliseconds (ms) and the second latency is at least 200 ms.

7. The system for multispectral object identification of claim 1, wherein the first dynamic range is at least approximately 90 dB+/−20 dB and the second dynamic range is at least approximately 50 dB+/−20 dB.

8. The system for multispectral object identification of claim 1, wherein the at least one first attribute and the at least one second attribute of the sensed object further comprises a shape, a size, a texture, a reflectivity level, a radar cross section, a color, and a three-dimensional position relative to a datum, the datum includes a vertical geodetic reference datum and a horizontal geodetic reference datum.

9. The system for multispectral object identification of claim 8, wherein determine a position and trajectory of the autonomous aircraft further includes a determination of a position and trajectory relative to the sensed object and a position and trajectory relative to the datum.

10. The system for multispectral object identification of claim 1, wherein the sensed object includes a terrain object, a geographical object, a natural object, a man-made object, an airport prepared surface, a landing surface, a flight deck, an aircraft, and a target of interest.

11. The system for multispectral object identification of claim 1, wherein identify the sensed object further comprises a comparison of the sensed at least one first attribute with the historical object data, the comparison including a percentage-based threshold match of a totality of object attributes.

12. The system for multispectral object identification of claim 1, wherein a difference between the at least one first attribute and the at least one second attribute includes a diversity in at least one of a frequency, a wavelength, a temperature, and a bandwidth.

13. The system for multispectral object identification of claim 1, wherein the object identification and positioning system determines which sensor of the sensor suite is the at least one first sensor and the at least one second sensor based on a sensor hierarchy, the sensor hierarchy based at least on a flight analysis.

14. The system for multispectral object identification of claim 13, wherein the flight analysis includes an analysis of the autonomous aircraft at least one of: an altitude, a mission, a speed and a sensor fidelity.

15. A method for multispectral object identification, comprising:
receiving first sensor data from at least one first sensor of an autonomous aircraft sensor suite onboard an autonomous aircraft, the first sensor data including at least one first attribute of a sensed object, the first sensor data received at a first frame rate and at a first latency, the first frame rate and first latency suitable for a flight control of the autonomous aircraft, the first sensor data also received at a second frame rate and at a second latency, the second frame rate and second latency suitable for a positioning of the autonomous aircraft;
receiving second sensor data from at least one second sensor of the autonomous aircraft sensor suite, the second sensor data including at least one second attribute of the sensed object, the second sensor data received within a first color spectrum and within a first dynamic range, the first color spectrum and the first dynamic range suitable for an object identification, the second sensor data also received within a second color spectrum and within a second dynamic range, the second color spectrum and the second dynamic range suitable for a navigation of the autonomous aircraft;
comparing the received at least one first attribute and the at least one second attribute to a historical object data within a multispectral database;
identifying the sensed object if one of the first or second attribute comparison results in a match;
determining a position of the autonomous aircraft based on the identification of the sensed object;
determining a trajectory of the autonomous aircraft based on the autonomous aircraft position over time;
commanding an autopilot to manipulate at least one autonomous aircraft flight control based on one of the position and the trajectory.

16. The method for multispectral object identification of claim 15, wherein receiving first sensor data from at least one first sensor further includes a time averaging and a time integration of the received at least one first and second attributes of the sensed object.

17. The method for multispectral object identification of claim 15, wherein determining a position of the autonomous aircraft further comprises a comparison of the sensed at least one first and second attribute with the historical object data, the comparison including a percentage-based threshold match of a totality of object attributes.

18. The method for multispectral object identification of claim 15, wherein receiving first sensor data from at least one first sensor further comprises a phase of flight analysis and a determination of a sensor hierarchy, each based on at least one of an altitude, a mission, a speed, and a sensor fidelity.

19. The method for multispectral object identification of claim 18, further including determining which sensor of the autonomous aircraft sensor suite is the first sensor and the second sensor based on the sensor hierarchy.

20. The method for multispectral object identification of claim 18, wherein commanding an autopilot further includes commanding a pitch and pitch rate, a roll and roll rate, a yaw and yaw rate, rate of climb, and a rate of descent.

* * * * *